United States Patent
Waechter

[19]

[11] Patent Number: 5,682,801
[45] Date of Patent: Nov. 4, 1997

[54] JAM PROOF LUG NUT

[76] Inventor: Thomas R. Waechter, 22185 Water St., Oldenberg, Ind. 47036

[21] Appl. No.: 622,367

[22] Filed: Mar. 26, 1996

[51] Int. Cl.⁶ ................................................ B25B 13/06
[52] U.S. Cl. ...................... 81/121.1; D8/397; 81/186; 411/402; 411/427
[58] Field of Search .................. 81/121.1, 124.6, 81/186; 411/427, 402, 410, 432; D8/397

[56] References Cited

U.S. PATENT DOCUMENTS

| | | | |
|---|---|---|---|
| D. 320,162 | 9/1991 | Sorenson | D8/397 |
| 519,354 | 5/1894 | Sheppard | 81/121.1 X |
| 1,940,617 | 12/1933 | Temple | D8/397 X |
| 2,046,105 | 7/1936 | Clarke | 411/402 |
| 3,369,441 | 2/1968 | Kosar | 411/427 |
| 4,126,063 | 11/1978 | Palmer | 81/124.6 |
| 5,269,208 | 12/1993 | Kolvites et al. | 81/121.1 X |
| 5,340,256 | 8/1994 | Morgan | 411/427 X |

*Primary Examiner*—James G. Smith
*Attorney, Agent, or Firm*—Woodard, Emhardt Naughton, Moriarty & McNett

[57] ABSTRACT

A jam proof lug nut and socket wrench combination. A lug nut has a polygonal shaped tapered main body. The tapered outer surfaces of the main body are arranged at an angle relative to the nut longitudinal axis greater than the interior polygonal surfaces of the socket wrench relative to its axis of rotation.

2 Claims, 3 Drawing Sheets

JAM PROOF LUG NUT

BACKGROUND OF THE INVENTION

1. Field of the Invention

This invention is in the field of fastening devices and more specifically lug nuts for holding a wheel on a vehicle axle.

2. Description of the Prior Art

Hexagonal shaped lug nuts are threaded onto axle bolts for mounting and holding a tire on a vehicle. The nuts may be installed or removed either with a manual tire wrench or a power driven rotating socket wrench. In the case of stock vehicle races, the lug nuts are rotated by means of a power tool. Frequent pit stops are required during the race to allow for refueling and changing of tires. The pit stops must be accomplished in a few seconds since the other vehicles are racing at great speeds. Typically, all four tires are changed and the vehicle is refueled within 18 seconds. In the case of the prior art lug nuts and socket wrenches, the socket is sized to exactly fit around the lug nut. Thus, if the lug nut is cocked in the socket, either the lug nut will fly out of the socket as the socket wrench is rotated or the lug nut must be removed and inserted properly into the socket before being threaded onto the bolt. Previous seconds are thereby lost.

In certain instances, it is possible for a lug nut which is quickly removed to have damaged threads and thus it is the practice to discard all lug nuts once they are removed from the axle bolt and to use new lug nuts when the replacement wheel is mounted to the vehicle. The technique utilized is to glue the new lug nuts atop each bolt hole on the replacement wheel. Once the old wheel is removed, the new wheel is mounted to the axle with the bolts extending through the wheel holes with the lug nuts being forced outwardly from the wheel but being retained thereon by the stretchable glue. Thus, the lug nut may be at various angles relative to the bolt with the result that when the power driven socket is forced against the lug nut, the lug nut will cock relative to the socket and become jammed therein. The possibility of this problem occurring is increased since the socket wrench may already be rotating prior to contacting the lug nut. In the event the lug nut does not jam within the socket then it is possible that the rotating socket will contact the lug nut in such a manner that the lug nut will fly off in various directions. It is therefore possible due to the urgency of completing the pit stop that the vehicle will re-enter the race even though all of the lug nuts are not installed thereby decreasing the safety of the race in case a wheel becomes disengaged from the axle. On the other hand, if the lug nut becomes jammed in the socket, then the mechanic must spend valuable time attempting to remove the lug nut from the socket. This may be accomplished by striking the socket wrench against the ground or by other techniques always resulting in lengthening of the pit stop. Further, race rules may limit each pit crew to a maximum of two power driven socket wrenches. In the event one socket wrench becomes jammed with a lug nut, then only one remaining socket wrench is available for changing all four wheels. All of the aforementioned presents a major difficulty in winning a race due to not only the lengthening of pit stops but also a decrease in the overall safety of the race. Disclosed herein is a jam proof lug nut/socket wrench combination which will alleviate this problem.

SUMMARY OF THE INVENTION

One embodiment of the present invention is a lug nut for holding a tire rim on a bolt extending from an axle mount comprising a tapered main body with a plurality of wrench engaging surfaces. The main body includes a proximal end abutable against the mount and a distal end with a threaded hole extending from the proximal end toward the distal end and a longitudinal axis extending through the threaded hole. The tapered main body including a polygonal shaped cross section which decreases in size along the axis toward the distal end.

Another embodiment of the present invention is a lug nut and lug nut wrench combination for mounting a wheel to a vehicle axle bolt comprising a tapered lug nut with a proximal end portion and a distal end and a threaded hole which receives the bolt. The hole extends between the proximal end and the distal end and has a longitudinal axis extending through the hole. The lug nut has a plurality of outer wrench engaging surfaces defining a lug nut polygonal perimeter which decreases in size along the axis toward the distal end. A wrench having interior surfaces defining a socket receives the lug nut with the wrench having an axis of rotation extending centrally through the socket. The interior surfaces contact the wrench engaging surfaces when the axis of rotation is coincident with the longitudinal axis only along a line of contact extending across the wrench engaging surfaces with the line contained in a plane perpendicular to the axis of rotation.

It is an object of the present invention to provide a new and improved lug nut for mounting a vehicle wheel.

A further object of the present invention is to provide a jam proof lug nut.

An additional object of the present invention is to provide a lug nut/lug nut wrench combination which is jam proof for mounting a wheel to a vehicle.

Related objects and advantages of the present invention will be apparent in the following description.

DESCRIPTION OF THE PREFERRED EMBODIMENT

Figure 2:
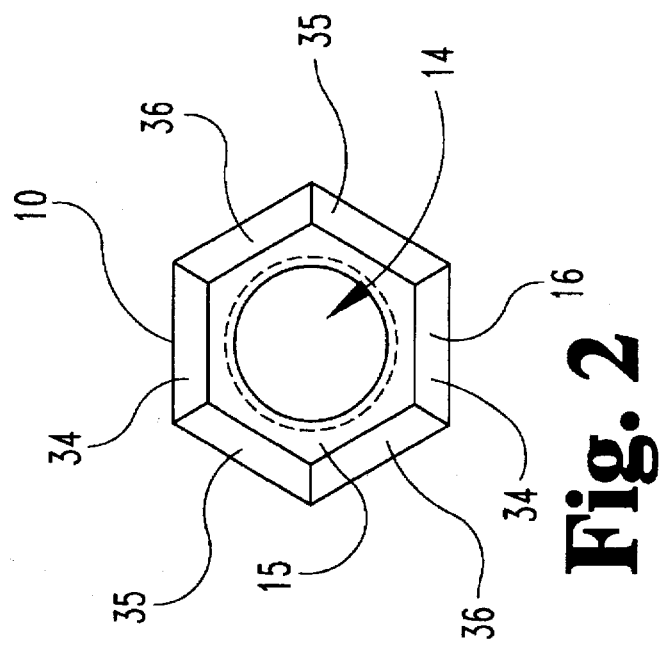
FIG. 2 is a right hand end view of the lug nut of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Lug nut 10 (FIG. 1) incorporating my new invention includes a tapered main body with a plurality of wrench engaging surfaces 16. Lug nut 10 may be threaded onto a conventional bolt extending from an axle mount for holding a tire rim to the axle mount. The lug nut includes a threaded hole 14 which extends from the proximal end portion 13 to the distal end 15. Proximal end portion 13 has a truncated conical and outwardly facing surface which is rounded to seat the lug nut against the axle mount when threaded onto the bolt thereby centering the lug nut in the axle mount hole relative to the threaded bolt extending through the lug nut.

Lug nut 10 has a tapered main body which extends from the proximal end portion 13 to the distal end 15. The tapered main body has a polygonal shaped outer surface which in the embodiment shown in the drawing is hexagonal. A plurality of wrench engaging surfaces 16 extend convergingly toward the nut longitudinal axis 30 from the proximal end portion 13 to distal end 15. Thus, the distal end 15 of the nut is smaller in size as compared to hexagonally shaped main body immediately adjacent the proximal end portion 13. In one embodiment, surfaces 16 are arranged at angle 17 with respect to a line 31 parallel to axis 30 in the amount of approximately 15°. Each wrench engaging surface 16 is contained in a separate plane which intersects axis 30 outwardly of distal end 15. The truncated conical shaped outer surface of proximal end portion 13 is arranged at angle 18 relative to a line 32 parallel to axis 30 in the approximate amount of 30°. As shown in FIG. 2, the cross-sectional area of lug nut 10 decreases in size from the rounded proximal end portion 13 to the distal end 15.

Figure 1:
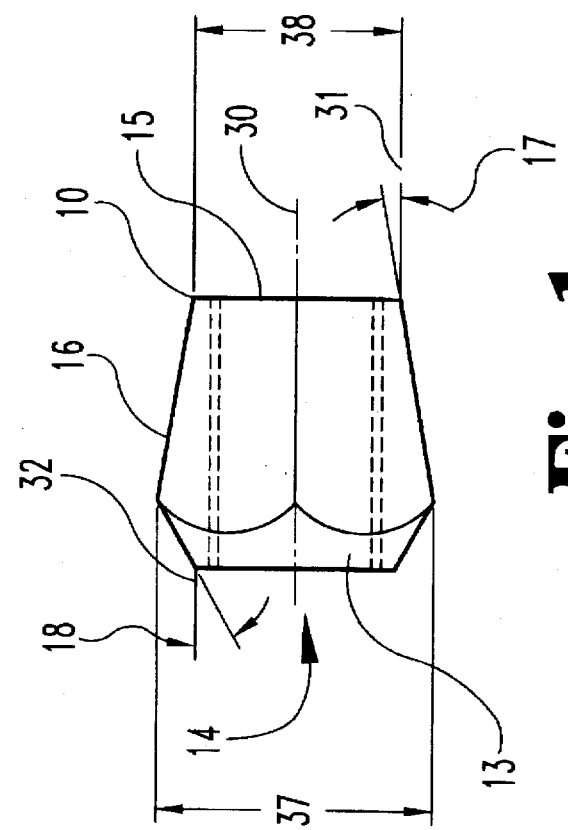
FIG. 1 is a side view of the lug nut incorporating my invention.

The hexagonal shape of lug nut 10 depicted in FIGS. 1 and 2 are formed by six separate wrench engageable surfaces which are arranged in pairs. That is, pairs 34 are mutually opposed on opposite sides of axis 30. Likewise, pairs 35 are located on opposite sides of axis 30 as are pairs 36. The surfaces within each pair are mutually opposed in a converging position and are spaced apart a first distance between arrows 37 at proximal end portion 13 and spaced apart a second distance between arrows at distal end 15 with the first distance at least 25% greater than the second distance. The surfaces within each pair are spaced apart a linear decreasing distance as the surfaces extend from proximal end portion 13 to distal end 15. For example, the two surfaces within pair 34 extend linearly toward each other as the surfaces extend from the area indicated by arrows 37 to the area indicated by arrows 38. Likewise, each surface 16 linearly and continually converge to axis 30 from end portion 13 to end 15.

Figure 3:
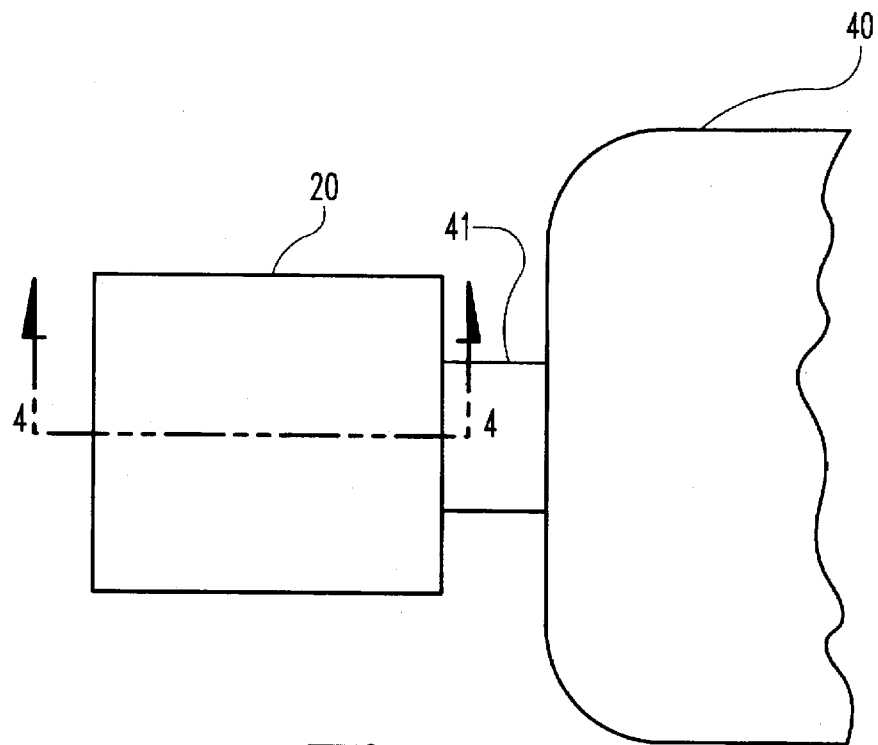
FIG. 3 is a fragmentary side view of a power driven socket wrench for installing and removing the lug nut of FIG. 1.
Figure 4:
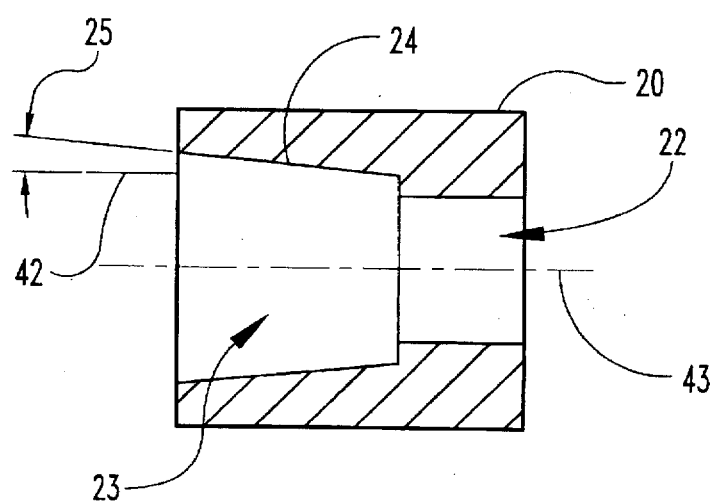
FIG. 4 is a cross-sectional view taken along the line 4—4 of FIG. 3 and viewed in the direction of the arrows.
Figure 6:
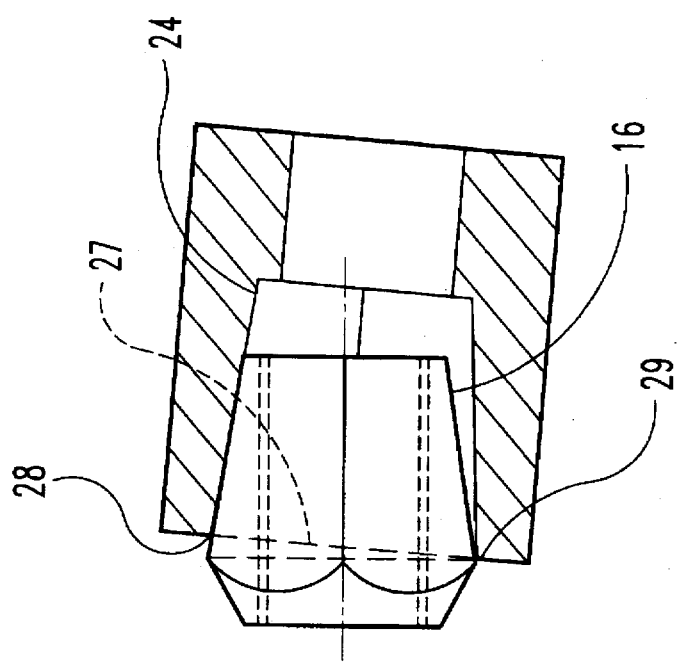
FIG. 6 is the same view as FIG. 5 only showing the lug nut in cocked positioned relative to the socket wrench.
Figure 5:
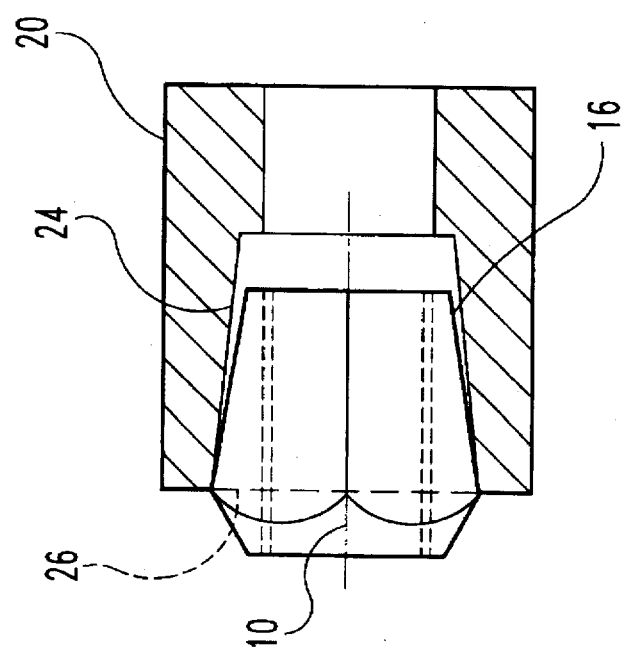
FIG. 5 is the same view as FIG. 4 only showing the lug nut positioned within the socket wrench with the longitudinal axis of each being aligned together.

The lug nut depicted in FIGS. 1 and 2 may be installed or removed from the bolt by means of either a manual tire wrench or a power driven wrench. The typical power driven wrench 40 (FIG. 3) includes a rotatable output shaft 41 upon which is mounted socket wrench 20 having a cylindrical main body with a hole 22 (FIG. 4) for receiving output shaft 41. Socket wrench 20 has a hexagonally shaped socket 23 composed of six flat surfaces 24 arranged to receive the six surfaces 16 of lug nut 10. Each surface 24 is arranged at an angle 25 relative to line 42 parallel to the central longitudinal axis of rotation 43 of the socket of approximately 5°. Socket 23 therefore tapers inwardly at an angle less than the taper of lug nut 10 ensuring that the surfaces 16 contact surfaces 24 only along a line of contact 26 (FIG. 5) when the lug nut is inserted into the socket as shown in FIG. 5. When axis 30 of lug nut 10 is coincident with axis 43 then the lug nut is inserted as depicted in FIG. 5 and is not cocked relative to the socket. In such a state, the lug will not jam relative to the socket wrench since surfaces 16 are engaging surfaces 24 only along a line of contact with the remaining portion of surfaces 16 being spaced apart from surfaces 24. On the other hand, if axis 30 of the lug nut is not coincident with axis 43 of the socket then the lug nut will be cocked relative to the wrench as depicted in FIG. 6. In the event the lug nut is cocked relative to the socket wrench as depicted in FIG. 6, then surfaces 24 will still contact surfaces 16 along line of contact 27 and in addition at least one of the surfaces 16 may be in total contact along its entire length with surface 24. Nevertheless, the remaining surfaces 16 will be spaced apart from surfaces 24, except along line 27, allowing the lug nut to be easily rocked within the wrench socket preventing the lug nut from jamming relative to the socket.

The mouth of socket 23 defined by edges 28 and 29 has an interior polygonal cross section which is greater in size than the cross sectional area of the lug nut polygonal cross section at distal end 15 but is less than the lug nut polygonal cross section at the proximal end portion 15. That is, surfaces 16 diverge sufficiently to extend outwardly of the mouth of socket 23 defined by surfaces 24. Whenever the lug nut is inserted into the socket in a non-cocked position, the line of contact 26 between surfaces 16 and 24 is contained in a plane perpendicular to the axis of rotation 43. Each surface 24 is contained in a separate plane which intersects the axis 43 at angle 42 whereas each surface 16 is contained in a separate plane which intersects axis 30 at angle 17 with angle 42 being less than angle 17.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A lug nut and lug nut wrench jam proof combination for mounting a wheel to a vehicle axle bolt comprising:

a tapered lug nut with a proximal end portion and a distal end and a threaded hole which receives said bolt with said hole extending between said proximal end portion and said distal end with a longitudinal axis extending through said hole, said lug nut having a plurality of outer wrench engaging surfaces defining a lug nut polygonal perimeter which decreases in size along said axis toward said distal end; and, a wrench having interior surfaces defining a socket receiving said lug nut with said wrench having an axis of rotation extending centrally through said socket, said interior surfaces contacting said wrench engaging surfaces when said axis of rotation is coincident with said longitudinal axis only along a line of contact extending across each of wrench engaging surfaces with said line contained in a plane perpendicular to said axis of rotation: and wherein:

each of said wrench engaging surfaces are contained in separate planes which converge toward said longitudinal axis at a first angle;

each of said interior surfaces are contained in separate planes which converge toward said axis of rotation at a second angle less than said first angle.

2. The combination of claim 1 wherein:

said socket has a mouth defined by said interior surfaces, said mouth receiving said lug nut and having an interior polygonal cross section greater in cross sectional area than said lug nut polygonal cross section at said distal end but less than said lug nut polygonal cross section at said proximal end portion.

* * * * *